J. THEOBALD.
GIG SADDLE TREES.
No. 175,204.   Patented March 21, 1876.
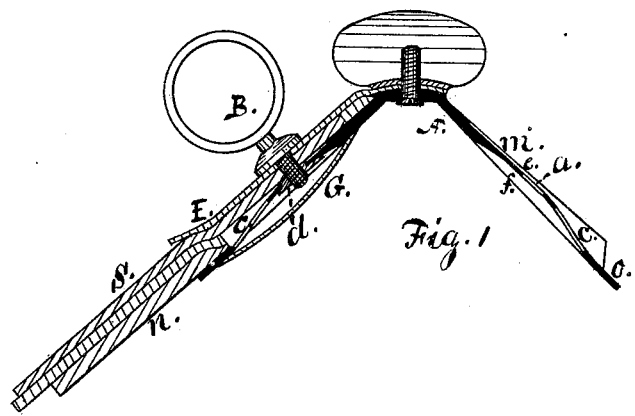
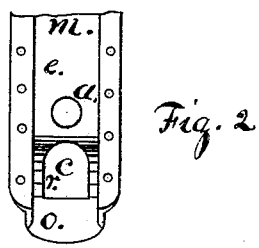
Witness
Horace Harris
John J. Baldwin
Inventor
John Theobald

UNITED STATES PATENT OFFICE.

JOHN THEOBALD, OF NEWARK, NEW JERSEY.

IMPROVEMENT IN GIG-SADDLE TREES.

Specification forming part of Letters Patent No. 175,204, dated March 21, 1876; application filed February 1, 1876.

*To all whom it may concern:*

Be it known that I, JOHN THEOBALD, of Newark, in the county of Essex and State of New Jersey, have invented a certain Improvement in Gig-Saddle Trees, of which the following is a specification:

My invention consists in the arrangement for the nut for the terret, and for attaching the back-strap, and in a guard preventing the end of the terret from galling the horse.

Figure 1 is a longitudinal section through the saddle-tree. Fig. 2 is a plan of one end of the tree.

Gig-saddle trees have been made with a recessed center on the upper side. In that case the nut for the terret is secured in position on the lower side of the tree, before the saddle is made up. Another tree has a recess below, forming a bridge above, and a hole below the bridge is made to receive the nut for the terret, and the end of the back-strap, to which it is made fast, and the two together are pushed in place below the bridge. The first has a fixed nut, and the back-strap is fixed on the upper side of the tree. The other has the nut and strap made fast together, and adjusted on the lower side of the tree, at the point of contact with the terret.

I have a provision for making up a saddle with or without the trimmings. The nut and back-strap are put in place separately, the nut on the under side and the strap on the upper side of the tree, after the saddle is made up.

The saddle-tree A is made with the ordinary hole *a* for the terret B, and a hole, *c*, below the hole *a*, through which the nut *d* is slipped into a recess, *f*, on the lower side of the tree. The lower end of the jockey E is loose, to allow the nut to be slipped under it into the hole *c*. On the back or lower side of the tree, and covering the recess *f*, is a cap, G, secured to the tree. This cap serves the double purpose, first, of forming a back for the recess, making a pocket into which the nut goes to be adjusted in position below the hole *a;* second, the cap covers the end of the terret, so that when the pad under it wears thin, the end of the terret will not gall the horse.

The saddle may be made without this cap in form, for the inside lining of the pad may be made to do an equivalent service.

On the upper side of the tree is a recess, *m*, in which the back-strap S rests, under the jockey. This strap is readily put in place for the terret to pass through it after the saddle is made up, being slipped under the open end of the jockey. The plane of the recess *m* varies to suit this purpose. The upper part *e* has a higher level than the end *o*, to which the stiffening-leather *n* is attached, below the hole *c*. The space between the two levels on the sides of the hole *c* is filled by an inclined plane, *r*. The nut is slipped in place over the plane *o* and under the plane *e*, and the back-strap is slipped into position, the end of it sliding up the inclined plane *r* from the level *o* to above the level *e*.

The invention, then, is this: The hole *c* for slipping in the nut is not new, and one recess in a tree in the upper or lower side is not; but the combination of the two recesses, the upper and under, and the inclined plane for carrying the end of the back-strap from the lower to the upper level is believed to be novel, and these arrangements constitute a very important improvement, providing that nuts and straps may be put in or changed separately at pleasure, after a saddle has been made up; therefore,

What I claim, and desire to secure by the protection of Letters Patent, is—

1. In the construction of a gig-saddle tree, the recesses *f* and *m*, in combination with the hole *c* and inclined plane *r*, substantially as and for the purposes specified.

2. The inclined plane *r*, at each side of the hole *c*, uniting the two levels *o* and *e*, substantially as and for the purpose set forth.

3. The gig-saddle tree provided with the recesses *m* and *f*, inclined plane *r*, and cap G, substantially as and for the purpose described.

JOHN THEOBALD.

Witnesses:
HORACE HARRIS,
JOHN J. BALDWIN.